(No Model.)
D. W. CURTIS.
BUTTER WORKER.
No. 302,546. Patented July 29, 1884.
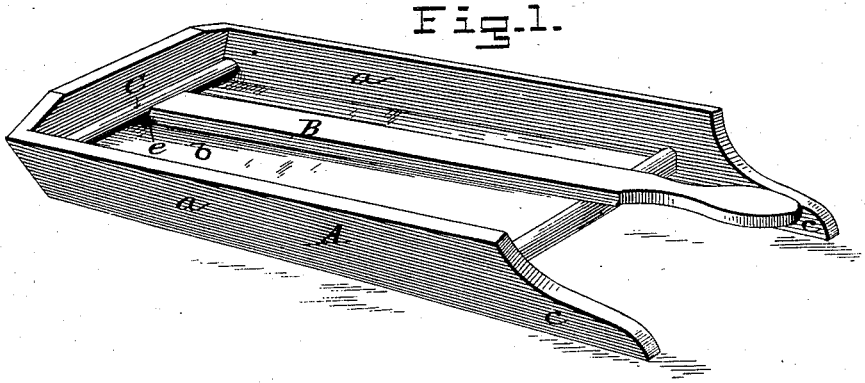
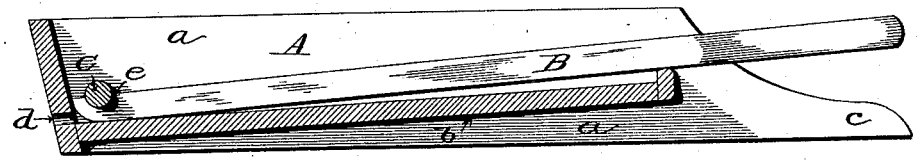
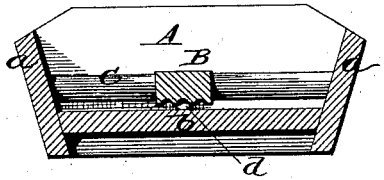
WITNESSES:
Jas. F. Duhamel.
Walter S. Dodge.
INVENTOR:
David W. Curtis,
by Dodge & Son,
Atty.

UNITED STATES PATENT OFFICE.

DAVID W. CURTIS, OF FORT ATKINSON, WIS., ASSIGNOR OF TWO-THIRDS TO OSCAR S. CORNISH AND WALTER S. GREENE, BOTH OF SAME PLACE.

BUTTER-WORKER.

SPECIFICATION forming part of Letters Patent No. 302,546, dated July 29, 1884.

Application filed March 13, 1884. (No model.)

*To all whom it may concern:*

Be it known that I, DAVID W. CURTIS, of Fort Atkinson, in the county of Jefferson and State of Wisconsin, have invented certain Improvements in Butter-Workers, of which the following is a specification.

My invention relates to butter workers and trays; and it consists in a tray with a sloping bottom and rearwardly-extending feet or sides, and having a cross-bar near the lower or forward end, under which the end of the presser-bar is passed, all as herein more fully set forth and claimed.

Figure 1 of the annexed drawings is a perspective view of my improved butter worker and tray; Fig. 2, a longitudinal vertical section, and Fig. 3 a transverse section.

Butter-workers have hitherto been designed and adapted for use only for the operation of working the butter, the tray being commonly provided with legs or a supporting-frame, or, if removable, not adapted to serve as a tray for containing butter, capable of being set away upon a shelf or in a cold room.

The purpose of my invention is to render the tray serviceable both as a butter-tray for general use and for special use in working the butter. This end I attain by making the tray without legs or supporting-frame, but adapted to rest upon an ordinary table, shelf, or other level surface, so that it may be used in any convenient place without requiring additional floor-room, and so, also, that it may be set away with the butter in it, in any place desired.

The tray A has its sides $a$ extended backward beyond its bottom $b$, in order to prevent its being tipped up when the working bar or lever B is pressed down, the handle of said lever of course extending backward in rear of the tray-bottom, as shown in Fig. 2. The feet $c$, formed by such extension, also afford a convenient hold for the hands in moving or carrying the tray. An outlet-opening, $d$, is made at the lower end of the tray, to permit the escape of the buttermilk.

C indicates a round rod or cross-bar extending across the tray from side to side, near its bottom, and close to the lower or forward end. This rod is designed to serve as a fulcrum for the lever or pressing-bar B, which has a groove, $e$, formed in its upper side, near its end, and is rounded off at the forward lower corner, to permit the end of the lever to be passed under the cross-bar when said lever is raised up to an upright position, but cannot be withdrawn when lowered to an approximately horizontal position, as will be readily understood upon referring to Fig. 2.

I am aware that the lever or pressing-bar of a butter-worker has before been perforated to permit the cross-rod to pass through it; but such construction prevents the removal of the lever or bar and renders cleaning very difficult. The bar or lever is free to be moved laterally along the rod C, so as to work over the entire surface of the tray. The under side of the lever or bar B is grooved, as shown in Fig. 3, to cause the butter to be pressed downward instead of merely spreading out at the sides.

I do not claim, broadly, the idea of extending the forward end of the lever beneath a fulcrum bar or rod; nor do I claim a lever or bar grooved on its under side, as both these features are old.

Having thus described my invention, what I claim is—

1. The herein-described butter-worker, consisting of tray A, the sides $a$ of which have extensions $c$, rod C, extending across the tray, and lever B, having its forward end inserted beneath the cross-rod, substantially as shown and described.

2. A tray for butter-workers, consisting of sides $a$, bottom $b$, and an end piece connecting the sides and bottom, the sides $a$ being formed with extensions $c$, as shown, to prevent the tray from tipping up in use, and to form handles by which to carry the tray.

DAVID W. CURTIS.

Witnesses:
O. S. CORNISH,
D. L. DAMUTH.